US005999263A

United States Patent [19]
Deck et al.

[11] Patent Number: 5,999,263
[45] Date of Patent: Dec. 7, 1999

[54] METHOD AND APPARATUS FOR PERFORMING INTERFEROMETRIC MEASUREMENTS WITH REDUCED SENSITIVITY TO VIBRATION

[75] Inventors: Leslie L. Deck; Peter de Groot, both of Middletown, Conn.

[73] Assignee: Zygo Corporation, Middlefield, Conn.

[21] Appl. No.: 09/013,781

[22] Filed: Jan. 26, 1998

[51] Int. Cl.$^6$ ................................................ G01B 9/02
[52] U.S. Cl. ........................................ 356/359; 382/108
[58] Field of Search .................................. 356/359, 360, 356/357; 250/559.05; 382/108

[56] References Cited

U.S. PATENT DOCUMENTS

| 5,355,221 | 10/1994 | Cohen et al. | 356/359 |
| 5,410,405 | 4/1995 | Schultz et al. | 356/351 |
| 5,473,434 | 12/1995 | de Groot | 356/359 |
| 5,589,938 | 12/1996 | Deck | 356/359 |

OTHER PUBLICATIONS

Instantaneous Phase Measuring Metrology, R. Smythe and R. Moore, SPIE, vol. 429, pp. 16–21.
Phase Shifting Interferometry in the Presence of Vibration: A New Algorithm and System, P. Winzinowich, App. Opt. vol. 29, No. 22, Aug. 1990, pp. 3271–3279.
Simultaneous Phase Shift Interferometer, C. Koliopoulos, SPIE vol. 1531, 1991, pp. 119–127.
Phase Shifting Interferometry, J. Greivenkamp and J. Bruning, Opt. Shop Testing, 2nd Ed. pp. 501–598.
Vibration in Phase-shifting Interferometry, P. de Groot, Opt. Soc. A., vol. 12, No. 2, Feb. 1995.
Vibration-insensitive Interferometer for On–line Measurements, M. Melozzi, L. Pezzati and A. Mazzoni, App. Opt. vol. 34, No. 25, Sep. 1995, pp. 5595–5601.
Numerical Simulations of Vibration in Phase-shifting Interferometry, P. de Groot, L. Deck, App. Opt. vol. 35, No. 13, May 1996, pp. 2172–2178.
Vibration-resistant Phase-shifting Interferometry, L. Deck, App. Opt. vol. 35, No. 34, Dec. 1996, pp. 6655–6662.

*Primary Examiner*—Samuel A. Turner
*Attorney, Agent, or Firm*—Fish & Richardson P.C.

[57] ABSTRACT

Interference data is acquired as a sequence of pairs of adjacent acquisition intervals in relative quadrature separated by non-acquisition intervals of known, typically constant, phase. The interval pairs in quadrature straddle interline transfer events of the imaging device, such that the two intervals of a given pair are separated only by the very short time interval of an interline transfer event. As a result, the two intervals are acquired serially but almost simultaneously. Preferably four quadpairs are acquired in a measurement, with the phase separation between the pairs being nominally an odd multiple of $\pi/2$. Because the intervals of each pair are acquired nearly simultaneously and in quadrature, the interference data exhibits similar favorable characteristics exhibited by simultaneous phase quadrature interference data. Namely, when phase calculations are performed using the interference data, ripple error associated with vibrational disturbances tends to cancel out. Advantageously, however, the system is much easier to implement than a true simultaneous phase quadrature system, and there is no requirement to separately measure the DC term of the interference pattern by performing an integration over $2\pi$.

25 Claims, 4 Drawing Sheets

METHOD AND APPARATUS FOR PERFORMING INTERFEROMETRIC MEASUREMENTS WITH REDUCED SENSITIVITY TO VIBRATION

BACKGROUND OF THE INVENTION

1. Field of Invention

The present invention relates to a method and apparatus for making interferometric measurements, and in particular relates to a method and apparatus for making interferometric measurements with reduced sensitivity to vibration.

2. Description of Related Art

Phase shifting interferometry (PSI) has become widely used and accepted as a fast and accurate non-contact metrology tool. The underlying measurement principle of PSI is to determine the phase of the intensity signal (interference data) received at each pixel of an imaging device, and to use the phase value for each pixel to determine a height value for each pixel. A primary advantage of PSI is its high precision. With careful control of environmental conditions, measurement precision to the nanometer scale or below is possible with PSI.

However, one of the most serious impediments to wider use and improved precision of PSI is its sensitivity to external vibrations with the consequence that PSI has rarely been used in a manufacturing environment in-situ. Instead, PSI has been relegated to use during post-manufacturing inspection.

Although numerous PSI algorithms exist for analyzing interferometric data, all standard PSI algorithms generally exhibit the following two vibration sensitivity characteristics. First, most PSI algorithms experience a peak in vibration sensitivity where the vibration frequency is equal to one-half the data acquisition rate. Thus, for example, if an interferometric system acquires interference data at a rate of 30 Hz, then the interferometric system is particularly sensitive to vibrations having a frequency of 15 Hz. The reason for the peak in vibration sensitivity at one-half the data acquisition rate is that vibrations at this frequency produce phase variations which are indistinguishable from phase variations produced by surface features.

Second, for all standard PSI algorithms, the rms averaged magnitude of the vibration sensitivity at the peak is approximately equal to one-half the vibration magnitude. Thus, if the vibration has a magnitude of about one hundred angstroms, the error component of the PSI measurement may be as much as fifty angstroms, depending on the vibration frequency.

In practice, these vibration characteristics are very problematic. The data acquisition rates which are used are typically 30 to 60 Hz; thus relatively low-frequency vibrations at 15 to 30 Hz and lower cause a majority of the problems. However, vibration sources at these lower frequencies are relatively common. For example, electric motors typically operate at 60 Hz and have subharmonics at 30 Hz and 15 Hz. Thus, the peak of vibration sensitivity occurs where, in practice, there is a disproportionate amount of vibration.

Additionally, at frequencies below one-half the data acquisition rate, vibrations are still very problematic even in the absence of a peak in vibration sensitivity. This is because vibration magnitude tends to be inversely proportional to vibration frequency. That is, lower frequency vibrations tend to have a larger magnitude than higher frequency vibrations. Thus, even though sensitivity to vibration is reduced at frequencies below one-half the data acquisition rate, the vibration magnitude is increased so that the net effect is that vibration is still very much of a problem.

Various mechanical systems have been devised for active vibration compensation. However, these systems are expensive and compensate for only a limited vibration amplitude range. Other mechanical systems have been provided for passive vibration isolation. However, these systems do not effectively isolate vibrations which occur at lower frequencies. In short, therefore, mechanical systems alone have not adequately addressed the problem of PSI vibration sensitivity.

As a result, various attempts have been made to provide PSI algorithms and acquisition methods which are less sensitive to vibration. For example, a brute force approach to reducing vibration sensitivity is to use a high speed camera to acquire interference data very rapidly. While significant reductions in vibration sensitivity can be achieved using this approach, this approach is expensive to implement due to the requirement of a relatively expensive high speed camera.

According to another approach, known in the art as the "Two Camera" method and disclosed in U.S. Pat No. 5,589,938 to L. Deck, a common low speed, high density camera and a high speed, low density camera are utilized in tandem to produce measurements with both high density and reduced sensitivity to vibration. However, the requirement of two cameras makes the system difficult to implement. Additionally, the degree of computation required to combine the data from the two separate cameras is substantially more than the degree of computation required to implement standard phase extraction algorithms. As a result, throughput is decreased. Finally, the light intensity generated by the illumination source must be shared by the two cameras; thus, each camera experiences a reduction in available intensity. Since available intensity is limited, even for the most expensive illumination sources, a reduction in intensity is undesirable.

According to another approach, known in the art as "simultaneous phase quadrature", the results of two PSI channels that acquire interference data simultaneously in phase quadrature are averaged to exactly cancel ripple errors. This approach uses the fact that phase measurement errors due to vibration typically manifest themselves as a periodic deformation, or ripple, at twice the frequency of the interference signal, and the fact that the sign of the ripple error changes every $\pi/2$. Because of these properties, the data from the two separate PSI channels can be averaged to exactly cancel ripple errors. This concept is simple in principle, but is difficult to implement in practice. Instruments capable of simultaneous phase quadrature are highly specialized and, in most cases, are prohibitively expensive.

Although truly simultaneous phase quadrature is a significant technical challenge, it has been shown that it is possible to approach this ideal using a single PSI channel and a camera with an interline transfer architecture. (See Wizinowich, "Phase shifting interferometry in the presence of vibration: a new approach and system," Appl. Opt. 29, 3271 (1990).) According to this approach, known in the art as the "2+1" method, an interline transfer camera is used for fast acquisition of two interferograms very closely spaced in time. The gap between the two interferograms is only microseconds since they are acquired on either side of the interline transfer event between two camera frames. A reference phase shifter is adjusted so that the phase difference between these two paired interferograms is 90 degrees (i.e., the paired interferograms are in phase quadrature). The quadrature pair acquisition is followed by a third acquisition (an integration over 2 π performed later) to determine the DC term of the interference pattern. Using the pair of interferograms and the DC term, the interferometric phase is calculated. The 2+1 method has demonstrably improved resistance to vibration over conventional PSI because the fact that the paired interferograms are acquired very rapidly "freezes" the vibrational state and reduces its influence on phase calculations.

Nevertheless, the requirement to separately measure the DC term by performing a 2 π integration undermines the utility of the 2+1 method. The problem with obtaining the DC term in the manner described is that it limits the dynamic range of the quadrature frames in order to ensure that the DC integration does not saturate the imaging device. It also requires near-perfect ramp control and very little vibration so that integration occurs over exactly 2 π. Because of these problems, the 2+1 method is difficult to implement practically and tends to perform poorly due to errors in the determination of the DC term. Finally, another problem with the 2+1 method is that the small number of data frames makes it susceptible to other forms of error, such as phase-shifter nonlinearity and miscalibration.

Other attempts at solving these problems have also not been completely satisfactory because they are expensive, difficult to implement, computationally intensive, and/or suffer increased sensitivity to other types of errors. Such approaches include, for example, those described in P. de Groot, "Vibration in phase shifting interferometry", J. Opt. Soc. Am. A 12, 354–365 (1995); C. T. Farrell and M. A. Player, "Phase-step insensitive algorithms for phase-shifting interferometry", Meas. Sci. Tech. 5, 648–652 (1994); I. Kong and S. Kim, "General algorithm of phase-shifting interferometry by iterative least-squares fitting", Opt. Eng. 34, 183–188 (1995); J. L. Seligson, C. A. Callari, J. E. Greivenkamp, and J. W. Ward "Stability of a lateral-shearing heterodyne Twyman-Green interferometer", Opt. Eng. 23, 353–356 (1984); J. A. Meiling, "Interferometric Metrology of Surface Finish Below 1 Angstrom RMS", (appearing in the April 1992 proceedings of the ASPE spring topical meeting on precision interferometric metrology); R. Smythe and R. Moore, "Instantaneous phase measuring interferometry", Opt. Eng. 23, 361–364 (1984); and U.S. Pat. Nos. 4,653,921 and 4,624,569 to Kwon and U.S. Pat. No. 5,410,405, to Schultz et. al.

SUMMARY OF THE INVENTION

The present invention overcomes these problems in the prior art. Furthermore, the presently preferred method of the present invention is applicable to many different types of interferometric systems, such as phase shifting interferometers or desensitized interferometers and requires only the addition of a shutter or equivalent means of controlling the amount of light transmitted to the electronic detection system, making upgrading existing designs easy and inexpensive. In addition, the presently preferred method of the present invention uses analysis techniques which are not computationally intensive and which permit high throughput.

By way of overview, interference data is acquired as a sequence of pairs of adjacent acquisition intervals in relative quadrature (hereinafter called a quadpair) separated by non-acquisition intervals of known, typically constant, phase. The pair of acquisition intervals in a quadpair (hereinafter called quadrature intervals) straddle interline transfer events, so that the two quadrature intervals of a given quadpair are separated only by the very short time interval of an interline transfer event. As a result, the quadrature intervals of a given quadpair are acquired serially but almost simultaneously, and a predetermined gap (the non-acquisition interval) separates the quadpairs. The quadpair gap is set so that the sequence of quadpairs preferably samples independent parts of the interference cycle. Because the interference data is acquired in quadrature, ripple error associated with vibrational disturbances is significantly reduced. Advantageously, however, the system is much easier to implement than a true simultaneous phase quadrature system, and there is no requirement to separately measure the DC term of the interference pattern by performing an integration over 2 π.

According to a particularly preferred embodiment of the invention, interferometric phase is determined by acquiring intensity data for a first quadpair, acquiring intensity data for at least one other quadpair, whose phase is separated from the first quadpair by a predefined amount, and determining the interferometric phase. The step of acquiring intensity data for the first quadpair includes the steps of acquiring intensity data for a first quadrature interval and then acquiring intensity data for a second quadrature interval with the two intervals being separated by an interline transfer event. Similarly, the step of acquiring intensity data for a second quadpair includes the steps of acquiring intensity data for a third quadrature interval, and then acquiring intensity data for a fourth quadrature interval. The two intervals of the second quadpair are again separated by an interline transfer event, and the separation between the first and second quadpairs is equal to a predefined value. If necessary or desired, further quadpairs are acquired in a similar manner.

The interferometric phase is determined based on the intensity data contained in the quadrature intervals. Any intensity variation occurring in the time interval between quadpairs is not important and may be ignored. Advantageously, since it is not necessary to acquire data during this interval, it is possible to use a standard-speed camera to perform the acquiring steps.

Preferably, a total of four quadpairs are acquired which are separated by a phase increment of approximately $N\pi/2$, where N is an integer, and preferably an odd integer. If four quadpairs are acquired in this manner, all four parts of the interference cycle are sampled, minimizing phase errors.

Even more preferably, the frames are acquired in such a manner that intensity contributions of frames from adjacent quadrature frames are summed by the imaging device. This increases the speed of the acquisition and further simplifies the phase extraction equations which are utilized.

According to another preferred embodiment of the invention, interferometric phase is determined by producing an interferogram, imaging the interferogram on an interline transfer photosensitive device, acquiring quadrature intensity data, and determining interferometric phase.

The step of producing an interferogram includes the steps of reflecting the reference light beam from a reference surface and the test light beam from a test surface, and recombining the reference light beam and the test light beam to form a recombined light beam. The recombined light beam is received by a pixel of the interline transfer photosensitive device.

For each of the steps of acquiring quadrature intensity data for the quadpairs, the following steps are performed. First, light which is received at the pixel of the interline transfer photosensitive device is integrated for a phase interval of the recombined light beam that is approximately equal to π. Additionally, an interline transfer is performed halfway through the first step. As a result, a quadpair consisting of two quadrature intervals is acquired during the first step, each corresponding to a respective ½ π interval of the π phase interval. Second, a shutter is closed starting at the end of the second quadrature frame of the just acquired quadpair and is reopened at the beginning of the first quadrature frame of the next quadpair. Thereafter, the two steps for quadpair acquisition are repeated for each succeeding quadpair.

After all of the acquiring steps have been performed, the phase difference is then determined by using the intensity data from each of the quadrature intervals in a formula derived specifically for the particular acquisition performed. The phase extraction formula varies depending on the number of quadpairs acquired and the phase separation between quadpairs.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not of limitation. Many modifications and changes within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

I. System Components and Architecture

Figure 1:
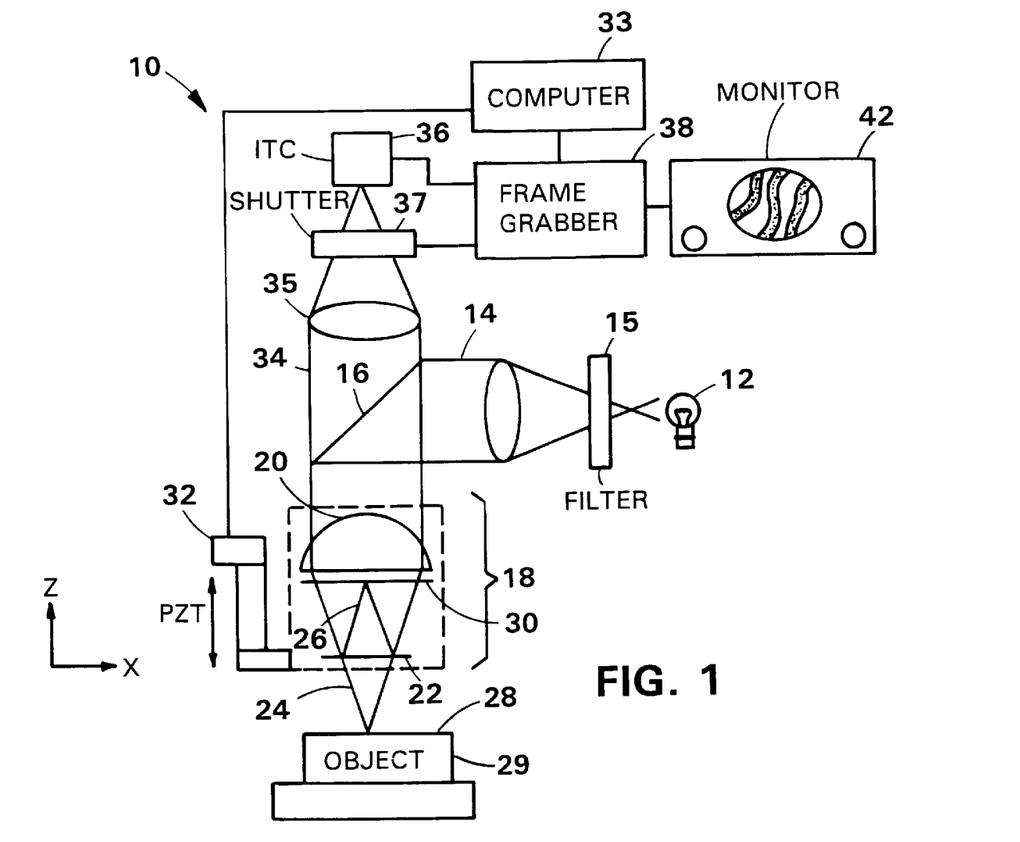
FIG. 1 is a schematic diagram of an interferometric system constructed in accordance with a preferred embodiment of the present invention.

Referring now to FIG. 1, a system 10 for obtaining interferometric measurements is illustrated. The system 10 comprises a source of illumination 12 which produces an incident light beam 14. Preferably, the incident light beam 14 is filtered by a narrow band filter 15 to increase the coherence length. Alternatively, the source of illumination 12 could instead be a laser. Lasers are inherently long coherence length illumination sources because they are narrow-band. Thus, the use of a laser eliminates the need for the filter 15.

The incident light beam 14 is reflected from an optical element 16 such as a beam splitter towards an interferometer 18. The interferometer 18 could comprise a lens 20 which focuses the incident light beam 14 and a beam splitter 22 which splits the incident light beam into a test light beam 24 and a reference light beam 26. The test light beam 24 is directed towards a test surface 28 of a test object 29. The reference light beam 26 is directed towards a reference surface 30.

A scanning and phase shifting apparatus 32 is also provided which varies the optical path difference between the test light beam 24 and the reference light beam 26 which introduces a phase shift between the test light beam 24 and the reference light beam 26, called the interferometric phase. The apparatus 32, which could for example be a piezoelectric transducer (PZT), is controlled by a computer 33. The scanning apparatus 32 scans the interferometer 18 parallel to the optical axis (Z-axis). The scanning velocity is controlled by the computer 33 so that consecutive frames correspond to 90° phase increments. The scanning and phase shifting apparatus 32 varies the interferometric phase at a rate which is rapid compared to conventional PSI methodologies.

After the test light beam 24 is reflected from the test surface 28, and after the reference light beam 26 is reflected from the reference surface 30, the two beams 24 and 28 are recombined by the beam splitter 22 so as to form a recombined light beam 34. The recombination of the two light beams 24 and 28 causes constructive and destructive interference between the two light beams 24 and 28. Therefore, when the recombined light beam 34 is directed onto an imaging array 36 by the optical element 16 and a focusing lens 35, an interferogram formed by the recombined light beam 34 imaged on the imaging array 36. The intensity variation of the interferogram across the imaging array 36 is thus a function of the relative topography of the imaged test surface 28 relative to the reference surface 30.

The imaging array 36 includes one or more pixels (e.g., 512×512) which are distributed in an X-Y plane and which each receive light from a specific location of the test surface 26. (The X-direction is as shown, and the Y-direction is as looking into the page of FIG. 1) The imaging array 36 is preferably a camera and, even more preferably, is an interline transfer, charge coupled device camera.

In an interline transfer camera (ITC), the area encompassed by each pixel is composed of a photosensitive region, a charge storage region, and an electronics region. After photo-integration by the photosensitive region, the accumulated charge is rapidly transferred (usually within a few microseconds) by the electronics region from the photosensitive region to the charge storage region. After the charge transfer occurs, the charge storage region is read out while the photosensitive region integrates the next frame.

The use of an interline transfer camera has been found to be particularly advantageous because the transfer time from the photosensitive region to the storage region of the pixel is extremely short. As a result, the time delay between the two frames of a quadpair is extremely short. Moreover, due to the provision of the charge storage regions, the pixels of an interline transfer camera have perfect frame time overlap. In other words, the pixels simultaneously integrate and acquire interference data during precisely the same time intervals.

Disposed between the optical element 16 and the imaging device 36 is a shutter 37. As detailed below in conjunction with FIGS. 2 and 3, the shutter 37 opens and closes in a predefined manner such that interference data is only acquired intermittently or in punctuated fashion. In practice, any type of shutter 37 could be used, such as a mechanical shutter, an electronic shutter (e.g., a current clamping circuit), an electro-optic shutter, and so on. The manner in which the opening and closing of the shutter is achieved depends, of course, on the type of shutter used. Also depending on the type of shutter used, the shutter may be internal or external to the imaging device 36.

A framegrabber 38 acquires consecutive images from the interline transfer camera 36 while the scanning and phase shifting apparatus 32 scans the interferometer 18 parallel to the optical axis at a constant velocity. The consecutive images acquired by the framegrabber 38 contain one or more frames of interference data, and each frame corresponds to a specific optical path difference position. The framegrabber 38 is controlled by the computer 33.

The interference data acquired by the imaging device 36 and acquired by the framegrabber 38 is fed directly from the frame grabber 38 to the computer 33. The computer 33 includes one or more computer programs (for example, in the form of software or firmware) which is executed by a microprocessor of the computer 33 to process the interference data.

Advantageously, therefore, the system 10 is implemented using standard components and without requiring a high speed camera or high speed frame grabber. The imaging device 38 can have a standard CCD camera architecture. As compared to typical PSI systems, the main hardware difference is the use of a shutter 37.

II. Acquisition of Interferometric Data

By way of overview, the interference data which is acquired is a sequence of pairs of adjacent acquisition intervals in relative quadrature separated by intervals of known, typically constant, phase. The interval pairs in relative quadrature ("quadpairs") straddle interline transfer events of the interline transfer camera, such that the two quadrature intervals of a given quadpair are separated only by the very short time interval of an interline transfer event. As a result, the quadrature intervals of a given quadpair are acquired serially but almost simultaneously, and a predetermined gap (non-acquisition interval) separates the quadpairs. Generally, at least two (and, more preferably, more) quadpairs should be acquired in a measurement, with the phase separation between the punctuated quadpairs set so that the sequence of quadpairs sample independent parts of an interference cycle (typically an odd multiple of $\pi/2$). When the phase separation of the quadpairs is set properly, and because the frames of each quadpair are acquired nearly simultaneously and in quadrature, the phase calculated therefrom exhibits significantly reduced error. Advantageously, however, the present invention is much easier to implement than a true simultaneous phase quadrature system. Moreover, there is no requirement to separately measure the DC term of the interference pattern by performing an integration over $2\pi$, and therefore the practical difficulties of the 2+1 method referred to previously are avoided.

Figure 2:
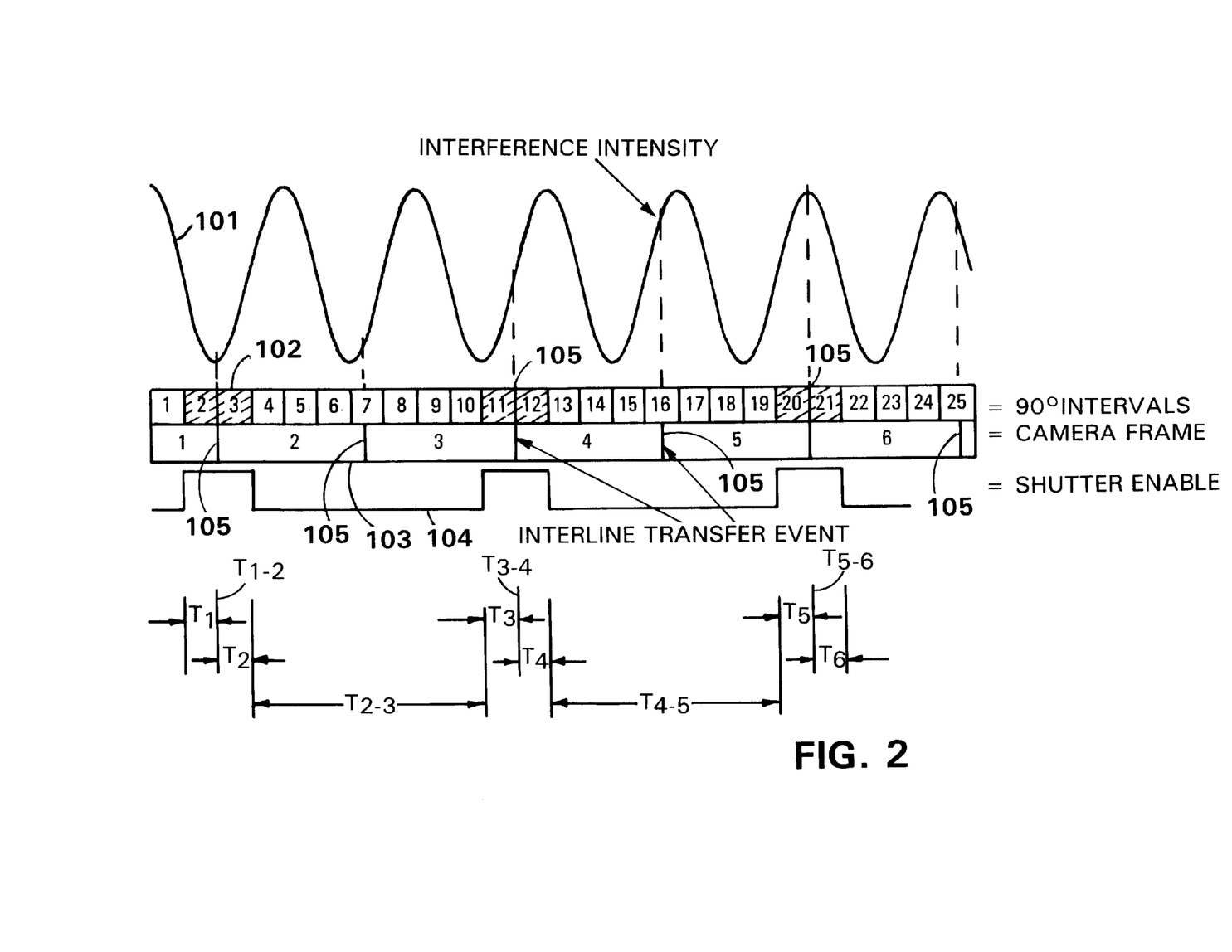
FIG. 2 is a timing diagram for the acquisition of three quadrature pairs having a 9 π/2 phase separation between quadpairs, in accordance with an embodiment of the present invention.

More specifically, and referring now to FIG. 2, a timing diagram for the acquisition of interference data according to one embodiment of the present invention is illustrated. FIG. 2 illustrates merely one example of the manner in which data may be acquired according to the present invention; a more generalized description of the manner in which data may be acquired is given in the following sections.

The intensity signal 101 is an idealized representation of the interference intensity produced by the constructive and destructive interference of the test and reference light beams as the scanning and phase shifting apparatus 32 scans the interferometer 18 parallel to the optical axis at a constant velocity. The phase of the intensity signal 101 is varied rapidly and linearly during the acquisition and the intensity measurements.

The time line 102 indicates the 90° phase increments of the intensity signal 101. Though time line 102 shows the 90° phase increments starting at integer multiple of $\pi/2$ (i.e., 0, $\pi/2$, $\pi$, $3\pi/2$, and so on), in general, the starting phase varies.

The time line 103 shows the start points and endpoints of the camera frames of the imaging device 36. The vertical lines 105 between adjacent camera frames represent the instants at which the interline transfer events occur.

The shutter enable signal 104 indicates when light (interference data) is allowed to reach the imaging device 36. When the shutter enable signal 104 is high, light is delivered to the imaging device 36; when the shutter enable signal 104 is low, light is not delivered to the imaging device 36. Of course, during the time that light is not delivered to the imaging device 36, interference data cannot be acquired, however the phase shifter 32 may still be changing the interferometric phase.

The shutter enable signal 104 and the phase shifter 32 are timed such that a 180 degree phase shift occurs during the shutter open period, and such that an interline transfer event occurs in the middle of the 180 degree phase shift. As a result, the 90 degree intervals that share a common shutter open period are each of 90 degrees duration, and are 90 degrees apart (i.e., in quadrature).

In the specific example illustrated in FIG. 2, the shutter 37 is open during interval #2, interval #3, interval #11, interval #12, interval #20, and interval #21. Thus, three quadpairs are acquired by the imaging device 36: a first quadpair formed by intervals #2 and #3, a second quadpair formed by intervals #11 and #12, and a third quadpair formed by intervals #20 and #21. The quadpairs are separated from each other by N $\pi/2$, where N is an odd integer. In the example illustrated, the first, second and third quadpairs are separated from each other by 9 $\pi/2$ and N therefore is equal to nine (the phase separation is measured from the leading edge of the first quadpair to the leading edge of the second quadpair.)

Due to the action of shutter 37, the acquisition pictured in FIG. 2 provides a one-to-one correspondence between interval and camera frame. Interval #2 is acquired in frame #1, interval #3 in frame #2, interval #11 in frame #3, etc. This however need not be the case, as will be described later.

In addition to being separated in phase, the quadpairs are also separated in time. The six acquired frames occur during time intervals $T_1$, $T_2$, $T_3$, $T_4$, $T_5$ and $T_6$, which all have approximately the same duration. The six acquired frames are separated by time intervals $T_{1-2}$, $T_{2-3}$, $T_{3-4}$, $T_{4-5}$, and $T_{5-6}$ (measured from the end of a previous frame to the beginning of the next frame, and not from beginning to beginning as the quadpair phase separations were measured). The time intervals between frames of a same quadpair (i.e., the time intervals $T_{1-2}$, $T_{3-4}$, and $T_{5-6}$) are all approximately the same duration and are all significantly shorter than the time intervals of the acquired frames. Ideally, the duration of these time intervals is as close to zero as possible. The time intervals between frames of adjacent quadpairs (i.e., the time intervals $T_{2-3}$ and $T_{4-5}$) are all at least approximately as long as the time intervals of the acquired frames. That is, they are approximately as long as the time interval of the acquired frames, or perhaps much longer. For example, in FIG. 2, the time interval $T_{2-3}$, is seven times as long as the time interval $T_2$.

Assuming the scanning and phase shifting apparatus 32 varies the interferometric phase linearly, then there is a one-to-one correspondence between separation in phase and separation in time. Typically, the interferometric phase is varied linearly, and therefore such a one-to-one correspondence exists. However, the interferometric phase could also be varied in a non-linear fashion, for example in a segmented fashion as described in Section VI below. Nevertheless, because maximum error cancellation occurs when specific N π/2 phase separations are achieved, the discussion herein focuses on the phase separation between quadpairs and not on the time separation.

III. Determining Surface Profile Based on Interferometric Data and Phase Extraction Equations To translate the intensity variation measured by the acquired quadpairs into a topographical phase, a phase extraction algorithm is required. Since the functional dependence of the phase to intensity is dependent on the acquisition method, the extraction algorithm used will also be dependent on the acquisition method. Using the phase extraction algorithm on the intensity data obtained for each pixel produces an interferometric phase for each pixel, and hence for each location on the sampled test surface 28. Once the interferometric phase is obtained for each pixel of the imaging device 36, the phases are spatially unwrapped to eliminate 2 π ambiguities and to produce a surface phase map that is directly proportional to the surface topography. (Since the phase value for each pixel calculated from the interference data is always modulo 2 π, the intermediate unwrapping step is necessary in order to eliminate the modulo 2 π uncertainty in the phase value.) In conjunction with the present invention, the steps of spatially unwrapping the phase values and converting the unwrapped phase values to height values can be performed using well known methodologies.

The phase extraction algorithms are derivable based on the following equation, which represents the phase as the argument of the complex Fourier amplitude of the intensity samples:

$$\varphi = \arg\left(\sum_{k=0}^{N-1} I(\varphi, \theta_k) S(\theta_k)\right) \quad (1)$$

where $I(\phi, \theta_k)$ is a real intensity, k is the interval number (ranging from one to twenty-five in FIG. 2), $\theta_k$ is the phase shift increment and is equal to k π/2, and $S(\theta_k)$ is a sampling kernel and is defined as $S(\theta_k) = w(\theta_k) W(\theta_k) e^{i\theta_k}$ (where $W(\theta_k)$ is the windowing function, which may for example be rectangular, and the sampling weights $w(\theta_k)$ are either 1 or 0 depending on whether or not the intensity for the particular phase shift $\theta_k$ is acquired). The "arg" function determines the phase difference between the real and imaginary components of a complex number, and is identical to the four quadrant arctangent of the ratio of the imaginary to real parts of a complex number. The resulting phase extraction formulas depend on the number of quadpairs taken and the relative phase shift (modulo 2 π) between them.

For example, the derivation of the phase extraction formula for three quadpairs with a phase separation of 9 π/2, as illustrated in FIG. 2 is as follows.

Equation (1) expands as follows:

$$\varphi = \arg\left(I_1 e^{i\frac{\pi}{2}} w_1 + I_2 e^{i2\frac{\pi}{2}} w_2 + I_3 e^{i3\frac{\pi}{2}} w_3 + \ldots\right) \quad (2)$$

By inspection of FIG. 2, the following values for $w_k$ are determined:

$$w_k = \begin{cases} 1 \text{ for } k = 2, 3, 11, 12, 20, 21 \\ 0 \text{ otherwise} \end{cases} \quad (3)$$

Thus, Equation (2) reduces as follows:

$$\varphi = \arg\left(I_2 e^{i2\frac{\pi}{2}} + I_3 e^{i3\frac{\pi}{2}} + I_{11} e^{i11\frac{\pi}{2}} + I_{12} e^{i12\frac{\pi}{2}} + I_{20} e^{i20\frac{\pi}{2}} + I_{21} e^{i21\frac{\pi}{2}}\right) \quad (4)$$

After evaluating the exponentials using the identity $e^{ix} = \cos(x) + i \sin(x)$, Eq. (4) reduces as follows:

$$\varphi = \arg(-I_2 - iI_3 - iI_{11} + I_{12} + I_{20} + iI_{21}) = \tan^{-1}\left(\frac{-I_3 - I_{11} + I_{21}}{-I_2 + I_{12} + I_{20}}\right) \quad (5)$$

Replacing the π/2 interval enumeration with a corresponding camera frame enumeration, the phase extraction algorithm is obtained:

$$\varphi = \tan^{-1}\left(\frac{-I_2 - I_3 + I_6}{-I_1 + I_4 + I_5}\right) = \tan^{-1}\left(\frac{I_6 - I_2 - I_3}{I_5 + I_4 - I_1}\right) \quad (6)$$

where $\phi$ is the interferometric phase for a given pixel, and $I_i$ is the light intensity integrated by the given pixel during the $i^{th}$ camera frame.

In a similar fashion phase extraction algorithms can be derived for any acquisition scenario. For example, the phase extraction algorithms for acquisitions having a different number of quadpairs (from three to five) and different quadpair phase separations are given in Table 1.

TABLE I

Phase Extraction Equations for Acquisitions Having Different Numbers of Quadpairs and Different Quadpair Phase Separations.

| Phase Separation | Number of Quadpairs | | |
|---|---|---|---|
| | 3 | 4 | 5 |
| $(\pi/2)_{2\pi}$ | (7) $\tan^{-1}\left(\frac{I_6 - I_2 - I_3}{I_5 + I_4 - I_1}\right)$ π | (8) $\tan^{-1}\left(\frac{I_6 + I_7 - I_2 - I_3}{I_5 + I_4 - I_1 - I_8}\right)$ π | (9) $\tan^{-1}\left(\frac{I_6 + I_7 - I_2 - I_3 - I_{10}}{I_5 + I_4 - I_1 - I_8 - I_9}\right)$ π |

TABLE I-continued

Phase Extraction Equations for Acquisitions Having Different
Numbers of Quadpairs and Different Quadpair Phase Separations.

| Phase Separation | Number of Quadpairs | | |
|---|---|---|---|
| | 3 | 4 | 5 |
| $(3\pi/2)_{2\pi}$ | (10) $\tan^{-1}\left(\dfrac{I_6 + I_3 - I_2}{I_5 - I_4 - I_1}\right)$ $\pi$ | (11) $\tan^{-1}\left(\dfrac{I_3 + I_6 - I_2 - I_7}{I_5 + I_8 - I_1 - I_4}\right)$ $\pi$ | (12) $\tan^{-1}\left(\dfrac{I_3 + I_6 - I_2 - I_7 - I_{10}}{I_5 + I_8 - I_1 - I_4 - I_9}\right)$ $\pi$ |
| $(\pi/2)_{2\pi}$ fast | (13) $\tan^{-1}\left(\dfrac{I_4 - I_2}{I_3 - I_1}\right)$ | (14) $\tan^{-1}\left(\dfrac{I_4 - I_2}{I_3 - I_1 - I_5}\right)$ | (15) $\tan^{-1}\left(\dfrac{I_4 - I_2 - I_6}{I_3 - I_1 - I_5}\right)$ |

The phase separations shown in the first column of Table I are modulo 2 π. Therefore, Eq. (7) may be used in conjunction with acquisitions having three quadpairs and a phase separation of π/2, 5 π/2, 9 π/2, 13 π/2 and so on, whereas Eq. (10) may be used in conjunction with acquisitions having three quadpairs and a phase separation of 3 π/2, 7/π2, 11 π/2, 15 π/2 and so on. The last row of the table gives phase extraction for acquisitions in which two frames of interference data are acquired during a single camera frame. This methodology is discussed in greater detail in Section IV below.

In short, therefore, the interferometric phase may be determined by acquiring interferometric data (for example, in the manner illustrated in FIG. 2) and applying the appropriate equation from Table I. Thereafter, the surface profile may be determined using conventional spatial unwrapping techniques (to eliminate the modulo 2 π uncertainty in the interferometric phase values for each pixel) and multiplying by a conversion factor (to convert each interferometric phase value to a height value relative to other test surface locations). Typically, the conversion factor used is ($\lambda O_c/2 \pi$), where λ is the mean wavelength of the filtered illumination source and $O_c$ is a correction factor for geometric obliquity.

It may be noted that the phase extraction equation for four quadpairs with a phase separation of π/2 (Eq. (8)) so that adjacent intervals overlap, is identical to the phase extraction equation for the Schwider five frame algorithm. This is because the acquisition schemes used in conjunction with the Schwider five frame algorithm can be viewed as acquiring a series of quadpairs which overlap both in terms of phase and time. Of course, since these acquisition schemes have quadpairs which overlap in this manner, the advantages of the present invention cannot be achieved with these schemes.

Advantageously, the degree of computation required for the equations of Table I is commensurate with the degree of computation required with conventional PSI phase extraction equations. Thus, unlike other approaches for reducing sensitivity to vibration, the present invention is able to determine interferometric phase in a manner which is not computationally intensive. As a result, measurement throughput is increased.

Of course, interferometric phase could be calculated in a manner other than through the use of an equation derived based on Eq. (1). For example, the interferometric phase could be determined by calculating the DC term as a weighted average of the frames of interference data for all the distinct quadpairs making up the acquisition, calculating a phase for each quadpair, and then summing the phases for each quadpair modulo 2 π after accounting for the expected phase increment due to the phase shifter. However, the equations derived based on Eq. (1) are preferred because they are more robust and can be evaluated quickly.

It may also be noted that other quadpair number/phase separation combinations may be used other than those for which an equation is listed in Table I. As discussed below, the combinations in Table I are merely the preferred combinations. Equations for other combinations may be determined on the basis of Eq. (1) and the sample derivation following thereafter.

IV. Fast Quadpair Acquisition

Figure 3:
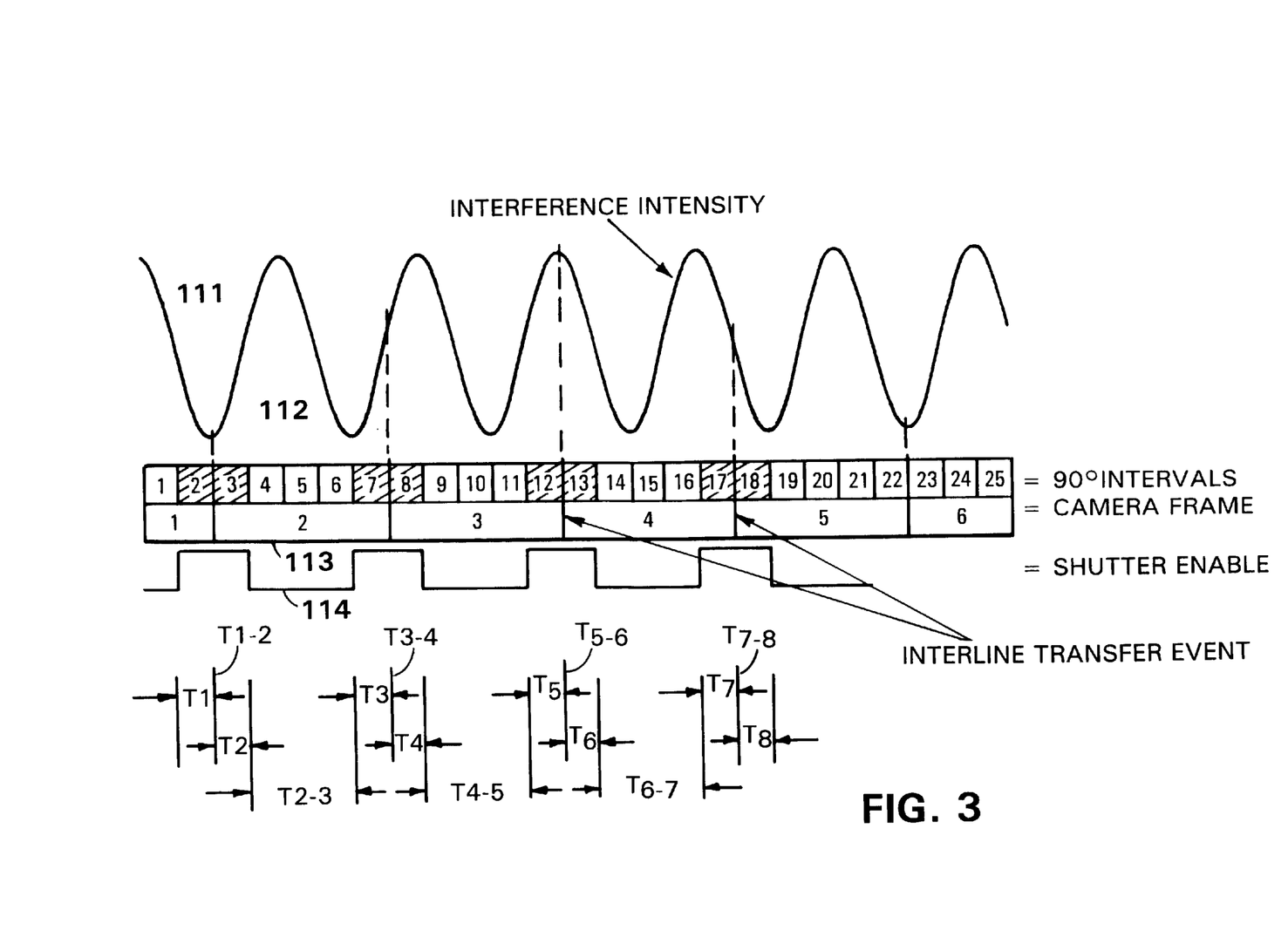
FIG. 3 is a timing diagram for the acquisition of four quadpairs having a 5 π/2 phase separation between quadpairs, in which frames of adjacent quadpairs are acquired during the same camera frame, in accordance with an embodiment of the present invention.

In an especially preferred embodiment, the quadpairs are acquired using a fast quadpair acquisition. More specifically, and referring now to FIG. 3, an intensity signal 111, time lines 112 and 113, and a shutter enable signal 114 are illustrated. The intensity signal 111, the time lines 112 and 113, and the shutter enable signal 114 of FIG. 3 are similar to the intensity signal 101, the time lines 102 and 103, and the shutter enable signal 104 of FIG. 2, respectively, except that they correspond to the fast quadpair type of acquisition.

The phase extraction equations for quadpair phase separations of $(\pi/2)_{2\pi}$ exhibit many terms which are sums of adjacent frames from neighboring quadpairs. For example, Eq. (8) may be considered:

$$\varphi = \tan^{-1}\left(\frac{I_2 + I_3 - I_6 - I_7}{I_5 + I_4 - I_1 - I_8}\right) \quad (8)$$

In order to highlight the sums of adjacent frames from neighboring quadpairs, Eq. (8) may be rewritten as follows:

$$\varphi = \tan^{-1}\left(\frac{(I_2 + I_3) - (I_6 + I_7)}{(I_5 + I_4) - I_1 - I_8}\right) \quad (8a)$$

The recognition that Eq. (8) may be written in the form of Eq. (8a) may be exploited in order to increase the speed with which quadpairs can be acquired.

Specifically, as illustrated in FIG. 3, the pixel of the imaging device 36 can be used to add the intensity contributions of the adjacent intervals from neighboring quadpairs. In FIG. 3, eight intervals of interference data are acquired. However, during camera frames #2, #3 and #4, two intervals of interference data are acquired, such that a total of only five camera frames are used.

Replacing the terms $I_1$, $(I_2+I_3)$, $(I_4+I_5)$, $(I_6+I_7)$, and $I_8$ of Eq. (8) with the terms $I_1$, $I_2$, $I_3$, $I_4$ and $I_5$ yields Eq. (14) of Table I:

$$\varphi = \tan^{-1}\left(\frac{I_2 - I_4}{I_3 - I_1 - I_5}\right) \tag{14}$$

where, for the acquisition illustrated in FIG. 3, $I_1$ is the intensity integrated during interval #2, $I_2$ is the intensity integrated during intervals #3 and #7, $I_3$ is the intensity integrated during intervals #8 and #12, $I_4$ is the intensity integrated during intervals #13 and #17, and $I_5$ is the intensity integrated during interval #18. Equations (8) and (14) are thus the same except that, in Eq. (14), the sums of adjacent frames are represented by a single $I_i$ term, indicating that the addition is performed by the imaging device.

In short, for a fast quadpair acquisition, a quadpair is acquired at every interline transfer event and the imaging device integrates the intensity contributions from the two intervals of interference data that occupy the same camera frame. The phase extraction formulas for these fast acquisitions are shown in the last row of Table I.

Fast quadpair acquisition is preferred because several benefits are achieved. These benefits include a factor of two increase in quadpair acquisition speed for the same level of intensity exposure, reduced sensitivity to phase shifter errors, improved computational throughput and a smaller total phase shift range for an equivalent vibration sensitivity reduction.

V. Number of Quadpairs and Quadpair Separation

Table I lists the phase extraction equations for acquisitions having from three to five quadpairs. In general, any number of quadpairs and any phase separation could be used and Eq. 1 will provide a useful phase extraction formula. However, the performance of the phase measurement in the presence of vibration is a sensitive function of the number of quadpairs and the phase separation between them. The measured phase error due to vibration generally decreases as the number of quadpairs increase. This is because each additional quadpair produces a new independent phase measurement. Exceptions to this rule occur if the phase separation is such that the same part of the interference cycle is repeatedly measured, which can happen with phase separations equal to an integer multiples of π radians. Quadpair phase separations of odd multiples of π/2 maximize the sampling of independent parts of the interference cycle with a minimum number of quadpairs. Therefore phase separations of odd multiples of π/2 are preferred. The acquisition that samples one complete interference cycle with the fewest measurements has four quadpairs and a quadpair phase separation of an odd multiple of π/2. The phase extraction formulae for these acquisitions are shown in the middle column of Table 1.

While it is possible to acquire five or more quadpairs, such an acquisition is not preferred. Although the additional quadpairs further reduce sensitivity to vibration, the reduced sensitivity to vibration is usually at the cost of an increased sensitivity to other types of systematic error. For example, one source of error arises when the rate of change of the phase of the phase shifter 32 is slightly different than the predetermined "ideal" rate. To the extent that the rate of phase change is non-ideal, this condition is more noticeable (in terms of error) when more quadpairs are acquired. It has been found that the increased sensitivity to these types of errors can outweigh the benefits of the reduced sensitivity to vibrations caused by acquiring additional quadpairs.

Other things being equal, the larger the phase separation, the slower the camera that may be used. Nevertheless, once the camera is chosen, the phase separation should be as small as possible (assuming a fixed ramp rate) so as to minimize sensitivity to vibration. As with any PSI methodology, a tradeoff exists between the speed (and cost) of the camera used and the vibration sensitivity which is experienced. The advantage of the present invention is that, for a fixed camera speed, reduced sensitivity to vibration is achieved.

Figure 4:
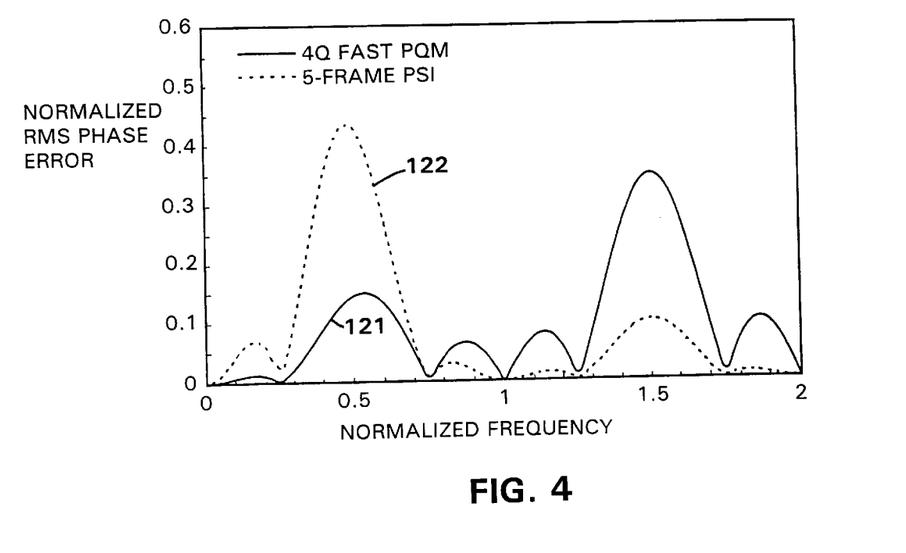
FIG. 4 is a graph comparing normalized RMS phase error for an embodiment of the present invention with that of a standard five frame PSI method.

Referring now to FIG. 4, the vibration spectral sensitivity of a four quadpair fast acquisition (curve 121) is compared to the sensitivity of the widely used Schwider five frame algorithm (curve 122). The camera frame rate is the same for both methods, but the phase shifter is run five times faster during the quadpair acquisition. Both methodologies experience a sensitivity peak at 0.5 which, as previously mentioned, is typical of all PSI algorithms that acquire interferograms with consecutive π/2 phase increments. Compared to the Schwider five frame algorithm however, the four quadpair fast acquisition provides sensitivity reduction out to a normalized frequency of 0.7 with significant improvement around 0.5.

Beyond the normalized frequency of 0.7, the four quadpair fast acquisition does not perform as well as the Schwider five frame algorithm. However, as previously noted, it is the low frequency regime which is particularly problematic. High frequency vibrations are generally less likely to occur than low frequency vibrations and, in any event, can be sufficiently addressed using conventional mechanical vibration isolation systems. Thus, sacrificing high frequency insensitivity for improved low frequency sensitivity provides for overall system improvement.

The improvement in vibration sensitivity occurs in the following manner. Each quadpair can be thought of as providing an independent determination of the interferometric phase with an associated phase error. The phase error contains contributions from sampling quantization, phase shifter nonlinearities and other stochastic processes, as well as systematic errors due to the phase evaluation. The systematic errors are functions of the starting phase, therefore, the quadpairs whose starting phase differ by π have approximately equal and opposite systematic errors. These systematic errors can therefore be canceled by adding the phase contributions from quadpairs in phase opposition. The vibration insensitivity of the present invention results from this phase error cancellation and optimal cancellation occurs when all the quadpairs have a partner in phase opposition, which occurs naturally for acquisitions containing an even number of quadpairs separated by an odd multiple of π/2.

VI. Segmented Phase Shifting for Interferometric Systems Using Short Coherence Length Illumination Referring now to FIG. 5, segmented phase shifting can be used to reduce the total phase range produced by the scanning and phase shifting apparatus, for example, in applications involving an equal-path interferometer having a low coherence illumination source (for example, due to the spectral width of the illumination source, the imaging optics, and so on).

As compared to a high coherence illumination source, which is typically used in conjunction with PSI methodologies, a low coherence illumination source produces an interference pattern having a shorter coherence envelope. Thus, the range of scan positions for which interference contrast is constant is relatively small. Since PSI generally assumes that the interference contrast is constant throughout the range of scan positions used to calculate interferometric phase, this limits the range of scan positions which may be used to calculate interferometric phase.

In the context of the present invention, when a continuous linear phase shift is used as described above, there is an unusually long total phase excursion as compared to conventional PSI. Thus, a way to reduce the total phase excursion would be advantageous, because it would allow interferometric phase to be calculated in situations where a low coherence illumination source is used.

In principle, the phase variation between quadpair measurements is not important and can be modified. The phase ramp must only act appropriately during the time it takes to acquire a quadpair, and it must provide the correct phase separation (modulo 2 π) between quadpairs.

Figure 5:
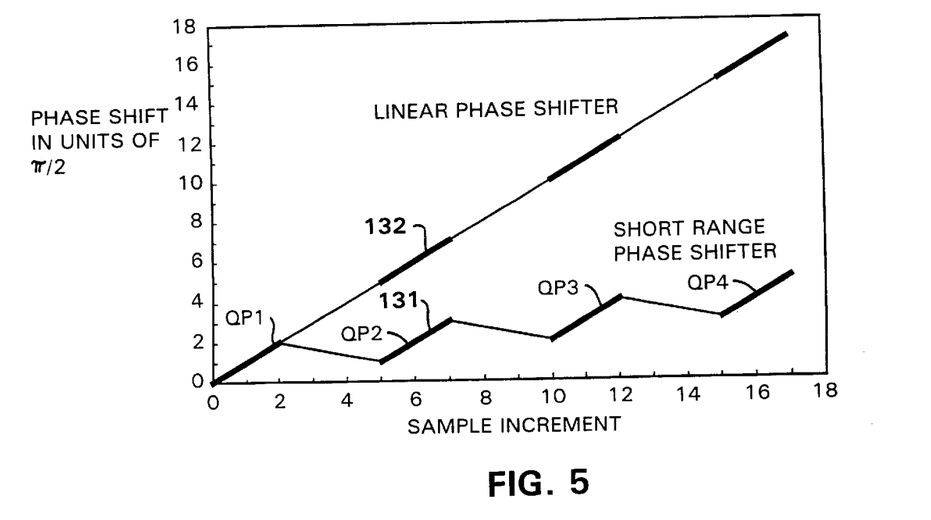
FIG. 5 is a segmented phase shift profile usable in conjunction with interferometric systems having low coherence illumination sources, in accordance with another embodiment of the present invention.

An example of a phase variation which reduces the total phase excursion is illustrated in FIG. 5. According to the segmented profile (curve 131) a first quadpair QP1, is acquired during the first two intervals. Then, during the next three intervals, no interference data is acquired. Instead, the scanning and phase shifting apparatus 36 shifts π/2 backward. Then, during the next two intervals, a second quadpair QP2 is acquired. The second quadpair is shifted π/2 from the first quadpair, and thus the second interval of quadpair #1 and the first interval of quadpair #2 overlap in phase (modulo 2 π). Importantly, however, they do not overlap in time. This repeats for third and fourth quadpairs QP3 and QP4.

Accordingly, the rate of phase change is positive when quadpairs are acquired, and is negative between quadpairs. Modulo 2 π, the phase separation between adjacent quadpairs is the same as when a purely linear phase ramp (curve 132) is used, but the total phase excursion is reduced from 9 π for the purely linear phase ramp (curve 132) to 5 π/2 for the segmented phase ramp. As a result, the present invention is usable in conjunction with interferometric systems that have a lower coherence illumination source.

Many changes and modifications may be made to the present invention without departing from the spirit thereof. The scope of these and other changes will become apparent from the appended claims.

We claim:

1. A method of determining an interferometric phase comprising the steps of:
   (A) acquiring a series of quadpairs, including, for each quadpair, the steps of:
      (1) opening a shutter, and projecting an interferogram onto an imaging device while simultaneously shifting a phase of the interferogram in a substantially linear fashion, then
      (2) integrating light from the interferogram received by the imaging device during a first interval, then
      (3) producing a substantially instantaneous image transfer event at the imaging device, then
      (4) integrating light from the interferogram received by the imaging device during a second interval the integrated phase difference between the first interval and the second interval being π/2, then
      (5) closing the shutter, and then
      (6) setting the phase shifter to a predefined relative starting phase prior to acquiring the next quadpair; and
   (B) calculating the interferometric phase based on the acquired series of quadpairs.

2. A method determining an interferometric phase comprising the steps of:
   (A) acquiring punctuated intensity data, including the steps of
      (1) acquiring intensity data for a first interval pair, including the steps of
         (a) acquiring intensity data for a first acquisition interval, and then
         (b) acquiring intensity data for a second acquisition interval; then
      (2) acquiring intensity data for a second interval pair, including the steps of
         (a) acquiring intensity data for a third acquisition interval, and then
         (b) acquiring intensity data for a fourth acquisition interval, the beginning of the third acquisition interval being separated from the end of the second acquisition interval by a time interval which is at least approximately as long as an average duration of the first, second, third and fourth intervals, the end of the first acquisition interval being separated from the beginning of the second interval by a time interval which is substantially less than the average duration of the first, second, third and fourth acquisition intervals, and the end of the third acquisition interval being separated from the beginning of the fourth acquisition interval by another time interval which is substantially less than the average duration of the first, second, third and fourth acquisition intervals; and
   (B) determining the interferometric phase based on the punctuated intensity data.

3. A method according to claim 2, further comprising the step of acquiring intensity data for a third interval pair, including the steps of
   (1) acquiring intensity data for a fifth acquisition interval, and then
   (2) acquiring intensity data for a sixth acquisition interval, the beginning of the fifth acquisition interval being separated from the end of the fourth acquisition interval by a time interval which is at least approximately as long as an average duration of the first, second, third, fourth, fifth and sixth acquisition intervals.

4. A method according to claim 3, further comprising the step of acquiring intensity data for a fourth interval pair, including the steps of
   (1) acquiring intensity data for a seventh acquisition interval, and then
   (2) acquiring intensity data for an eighth acquisition interval,
   the beginning of the seventh acquisition interval being separated from the end of the sixth acquisition interval by a time interval which is at least as long as an average duration of the first, second, third, fourth, fifth, sixth, seventh and eighth acquisition intervals; and
   wherein the intensity data is acquired from a cyclic intensity signal consisting of four different π/2 parts which repeat with each 2 π cycle of the cyclic intensity signal, and wherein the first, second, third and fourth interval pairs each sample a different one of the four different π/2 parts of the intensity signal.

5. A method according to claim 3,
   wherein the beginning of the first interval pair and the beginning of the second interval pair are separated by a phase increment of approximately M π/2, where M is an integer, and
   wherein the beginning of the second interval pair and the beginning of the third interval pair are separated by a phase increment of approximately N π/2, where N is an integer.

6. A method according to claim 5, wherein M and N are odd.

7. A method according to claim 2,
   wherein the acquiring step (A) is performed by an interline transfer camera having a pixel, and wherein a first interline transfer event occurs between the acquiring steps (A)(1)(a) and (A)(1)(b), and a second interline transfer event occurs between the acquiring steps (A)(2)(a) and (A)(2)(b), the first and second interline transfer events each comprising a transferring step in which charge is transferred from a photosensitive region of the pixel to a charge storage region of the pixel.

8. A method according to claim 7, wherein the first and second interline transfer events are consecutive interline transfer events, such that the pixel combines intensity contributions from the second and third acquisition intervals before the second interline transfer event occurs.

9. A method according to claim 2,
wherein the intensity data is acquired from an intensity signal,
wherein the method further comprises the steps of
(1) inducing a first phase change in the intensity signal during the performance of the acquiring step (A)(1), the first phase change occurring at a first rate of change;
(2) inducing a second phase change in the intensity signal between the performance of the acquiring step (A)(1) and the performance of the acquiring step (A)(2), the second phase change occurring at a second rate of change;
(3) inducing a third phase change in the intensity signal during the performance of the acquiring step (A)(2), the third phase change occurring at a third rate of change; and
wherein the second rate of change is less than the first rate of change and is less than the third rate of change.

10. A method according to claim 9, wherein the second rate of change is negative with respect to the first rate of change and with respect to the third rate of change.

11. A phase shifting interferometric system comprising:
an illumination source, the illumination source producing a light beam;
an interferometer, the interferometer splitting the light beam into first and second light beams, and the interferometer recombining the first and second light beams after at least one of the first and second light beams is reflected from the test surface, the recombined first and second light beams forming an interferogram;
a phase shifter, the phase shifter inducing phase shifts between the first and second light beams;
a photosensitive device, the photosensitive device including a pixel, the pixel acquiring punctuated intensity data from the interferogram, the intensity data including a first interval pair formed of adjacent first and second acquisition intervals and a second interval pair formed of adjacent third and fourth acquisition intervals, the first and second acquisition intervals being non-adjacent with the third and fourth acquisition intervals;
a shutter, the shutter preventing the photosensitive device from acquiring intensity data between the first and second interval pairs; and
a computer, the computer being coupled to the photosensitive device, the computer determining an interferometric phase of the interferogram based on the punctuated intensity data.

12. A phase shifting interferometric system according to claim 11,
wherein the photosensitive device is an interline transfer camera;
wherein the pixel includes a photosensitive region and a charge storage region; and
wherein a first interline transfer event separates the adjacent first and second acquisition intervals, and a second interline transfer event separates the adjacent third and fourth acquisition intervals, the first and second interline transfer events each comprising a transfer of charge from the photosensitive region of the pixel to the charge storage region of the pixel.

13. A phase shifting interferometric system according to claim 11, wherein the punctuated intensity data further includes a third interval pair, the third interval pair being formed of adjacent fifth and sixth acquisition intervals, and the fifth and sixth acquisition intervals being non-adjacent with the first and second acquisition intervals and being non-adjacent with the third and fourth acquisition intervals.

14. A phase shifting interferometric system according to claim 13,
wherein the beginning of the first interval pair and the beginning of the second interval pair are separated by a phase increment of approximately M $\pi/2$, where M is an integer, and
wherein the beginning of the second interval pair and the beginning of the third interval pair are separated by a phase increment of approximately N $\pi/2$, where N is an integer.

15. A method of determining an interferometric phase comprising the steps of:
(A) producing an interferogram, including the steps of
(1) producing a light beam with an illumination source,
(2) splitting the light beam into first and second light beams, and reflecting at least one of the first and second light beams from a test surface, and
(3) recombining the first and second light beams to form a recombined light beam;
(B) imaging the interferogram on a photosensitive device, the photosensitive device including a pixel which receives the recombined light beam;
(C) acquiring quadrature intensity data for a first quadrature pair using the pixel of the photosensitive device, including the steps of
(1) acquiring a first quadrature interval, the first quadrature interval occurring during a time interval $T_1$, and then
(2) acquiring a second quadrature interval, the second quadrature interval occurring during a time interval $T_2$, the end of the first quadrature interval and the beginning of the second quadrature interval being separated by a time interval $T_{1-2}$, and the beginning of the first quadrature interval and the beginning of the second quadrature interval being separated by a $\pi/2$ phase interval; then
(D) acquiring quadrature intensity data for a second quadrature pair using the pixel of the photosensitive device, including the steps of
(1) acquiring a third quadrature interval, the third quadrature interval occurring during a time interval $T_3$, and the end of the second quadrature interval and the beginning of the third quadrature interval being separated by a time interval $T_{2-3}$, and then
(2) acquiring a fourth quadrature interval the fourth quadrature interval occurring during a time interval $T_4$, the end of the third quadrature interval and the beginning of the fourth quadrature interval being separated by a time interval $T_{3-4}$, and the beginning of the third quadrature interval and the beginning of the fourth quadrature being separated by a $\pi/2$ phase interval; and then (E) acquiring quadrature intensity data for a third quadrature pair using the pixel of the photosensitive device, including the steps of
  (1) acquiring a fifth quadrature interval, the fifth quadrature interval occurring during a time interval $T_5$, and the end of the fourth quadrature interval and the beginning of the fifth quadrature interval being separated by a time interval $T_{4-5}$, and then
  (2) acquiring a sixth quadrature interval the sixth quadrature interval occurring during a time interval $T_6$, the end of the fifth quadrature interval and the beginning of the sixth quadrature interval being separated by a time interval $T_{5-6}$, and the beginning of the fifth quadrature interval and the beginning of the sixth quadrature interval being separated by a $\pi/2$ phase interval; and then (F) determining the interferometric phase based on the first, second, third, and fourth quadrature intervals and ignoring data which occurs between the second and third quadrature intervals and the data which occurs between the fourth and fifth quadrature intervals;

wherein the time intervals $T_1, T_2, T_3, T_4, T_5$ and $T_6$ are all of approximately equal duration, wherein the time intervals $T_{1-2}, T_{3-4}$, and $T_{5-6}$ are all of approximately equal duration and are all significantly shorter than the time intervals $T_1, T_2, T_3, T_4, T_5$ and $T_6$, and wherein the time intervals $T_{2-3}$ and $T_{4-5}$ are both at least approximately as long as each of the time intervals $T_1, T_2, T_3, T_4, T_5$ and $T_6$.

16. A method according to claim 15, further comprising the step of acquiring quadrature intensity data for a fourth quadrature pair using the pixel of the photosensitive device, including the steps of
  (1) acquiring a seventh quadrature interval, the seventh quadrature interval occurring during a time interval $T_7$, and the end of the sixth quadrature interval and the beginning of the seventh quadrature interval being separated by a time interval $T_{6-7}$, and then
  (2) acquiring an eighth quadrature interval, the eighth quadrature interval occurring during a time interval $T_8$, the end of the seventh quadrature interval and the beginning of the eighth quadrature interval being separated by a time interval $T_{7-8}$, and the beginning of the seventh quadrature interval and the beginning of the eighth quadrature interval being separated by a $\pi/2$ phase interval; and wherein, during the determining step (F), the interferometric phase is also determined based on the seventh and eighth quadrature intervals;

wherein the time intervals $T_1, T_2, T_3, T_4, T_5, T_6, T_7$ and $T_8$ are all of approximately equal duration, wherein the time intervals $T_{1-2}, T_{3-4}, T_{5-6}$ and $T_{7-8}$ are all of approximately equal duration and are all significantly shorter than the time intervals $T_1, T_2, T_3, T_4, T_5, T_6, T_7$ and $T_8$, and wherein the time intervals $T_{2-3}, T_{4-5}$ and $T_{6-7}$ are at least approximately as long as each of the time intervals $T_1, T_2, T_3, T_4, T_5, T_6, T_7$ and $T_8$; and wherein the intensity data is acquired from a cyclic intensity signal consisting of four different $\pi/2$ parts which repeat with each $2\pi$ cycle of the cyclic intensity signal, and wherein the first, second, third and fourth quadrature pairs each sample a different one of the four different $\pi/2$ parts of the intensity signal.

17. A method according to claim 15, wherein each of the first, second, third, fourth, fifth and sixth quadrature intervals corresponds to a phase increment of $\pi/2$, wherein the beginning of the second quadrature pair is separated from the beginning of the first quadrature pair by a phase increment of approximately $M\pi/2$, wherein the beginning of the third quadrature pair is spaced from the beginning of the second quadrature pair by a phase increment of approximately $N\pi/2$, and wherein M and N are integers.

18. A method according to claim 17, wherein M is equal to N and wherein M and N are both an odd integer.

19. A method according to claim 15, wherein acquiring steps (C), (D) and (E) are performed by an interline transfer camera, and wherein the instants at which the first, third and fifth quadrature frames terminate correspond to first, second and third interline transfer events, respectively.

20. A method according to claim 19, wherein the first, second and third interline transfer events are consecutive interline transfer events, such that the pixel combines intensity contributions from the second and third quadrature intervals before the second interline transfer event occurs, and such that the pixel combines intensity contributions from the fourth and fifth quadrature frames before the third interline transfer event occurs.

21. A method according to claim 15,
wherein the intensity data is acquired from an intensity signal,
wherein the method further comprises the steps of
  (1) inducing a first phase change in the intensity signal during the performance of the acquiring step (C), the first phase change occurring at a first rate of change;
  (2) inducing a second phase change in the intensity signal between the performance of the acquiring step (C) and the performance of the acquiring step (D), the second phase change occurring at a second rate of change;
  (3) inducing a third phase change in the intensity signal during the performance of the acquiring step (D), the third phase change occurring at a third rate of change; and
wherein the second rate of change is less than the first rate of change and is less than the third rate of change.

22. A method according to claim 21, wherein the second rate of change is negative with respect to the first rate of change and with respect to the third rate of change.

23. A method of determining a phase difference between a reference light beam and a test light beam, the method comprising the steps of:

(A) producing an interferogram, including the steps of
  (1) reflecting the reference light beam from a reference surface and the test light beam from a test surface, and
  (2) recombining the reference light beam and the test light beam to form a recombined light beam;

(B) imaging the interferogram on an interline transfer photosensitive device, the interline transfer photosensitive device including a pixel which receives the recombined light beam;

(C) acquiring quadrature intensity data for a first quadrature pair, including the steps of
  (1) integrating light received at the pixel of the interline transfer photosensitive device for a first phase interval of the recombined light beam approximately equal to $\pi$,
  (2) performing a first interline transfer approximately halfway through the first phase interval such that first and second quadrature intervals are acquired, the first quadrature interval corresponding to a first $\frac{1}{2}\pi$ interval and the second quadrature interval corresponding to a second ½ π interval which immediately follows the first ½ π interval; then (D) closing a shutter so as to prevent the pixel from integrating light, keeping the shutter closed for a time interval which is at least approximately as long as a time interval during which the first ½ π interval is acquired, and thereafter reopening the shutter; then (E) acquiring quadrature intensity data for a second quadrature pair, the beginning of the second quadrature pair being separated from the beginning of the first quadrature pair by a phase increment of approximately M π/2, where M is an integer, including the steps of (1) integrating light received at the pixel of the interline transfer photosensitive device for a second phase interval of the recombined light beam approximately equal to π, (2) performing a second interline transfer approximately halfway through the second phase interval such that third and fourth quadrature intervals are acquired, the third quadrature interval corresponding to a third ½ π interval and the fourth quadrature interval corresponding to a fourth ½ π interval which immediately follows the third ½ π interval; then (F) closing the shutter so as to prevent the pixel from integrating light, keeping the shutter closed for a time interval which is at least approximately as long as a time interval during which the third ½ π interval is acquired, and thereafter reopening the shutter; then (G) determining the interferometric phase based on the first, second, third and fourth quadrature intervals.

24. A method according to claim 23, wherein the first and second interline transfers are consecutive interline transfers, such that the pixel combines intensity contributions from the second and third quadrature intervals before the second interline transfer event occurs.

25. A method according to claim 23, wherein the intensity data is acquired from an intensity signal, wherein the method further comprises the steps of (1) inducing the first phase interval in the intensity signal during the performance of the acquiring step (C), the first phase interval occurring at a first rate of change;

(2) inducing the second phase interval in the intensity signal during the performance of the acquiring step (E), the second phase interval occurring at a second rate of change;

(3) inducing a third phase change in the intensity signal during the performance of the shutter closing step (D), the third phase change occurring at a third rate of change;

wherein the third rate of change is less than the first and second rates of change.

* * * * *